United States Patent [19]

Damodaran

[11] Patent Number: 5,436,014

[45] Date of Patent: Jul. 25, 1995

[54] REMOVING LIPIDS FROM CHEESE WHEY USING CHITOSAN

[76] Inventor: Srinivasan Damodaran, 826 Sauk Ridge Trail, Madison, Wis. 53717

[21] Appl. No.: 146,606

[22] Filed: Nov. 2, 1993

[51] Int. Cl.$^6$ ............................................. A23C 21/08
[52] U.S. Cl. ...................................... 426/33; 426/41; 426/330.3; 426/271; 426/491; 426/583; 426/417; 210/638; 210/639
[58] Field of Search ..................... 426/271, 330.3, 478, 426/486, 491, 583, 33, 41, 417; 210/638, 639

[56] References Cited

U.S. PATENT DOCUMENTS

| | | |
|---|---|---|
| 2,606,181 | 8/1952 | Pratt . |
| 3,560,219 | 2/1971 | Attebery . |
| 4,223,023 | 9/1980 | Furda ................................ 426/658 |
| 4,229,342 | 10/1980 | Mirabel . |
| 4,278,696 | 7/1981 | Magnolato ......................... 426/271 |
| 4,543,261 | 9/1985 | Harmon . |
| 4,844,923 | 7/1989 | Herrmann . |

OTHER PUBLICATIONS

Nauss 1983 The Binding of Micellar Lipids to Chitosan Lipids 18 (10) 714–719.
Knorr 1984 Use of Chitenous Polymers in Food Food Technology Jan. issue p. 850.
Knorr 1983 Dye Binding Properties of Chiten and Chutosen J. Food Sci 48:36.
Bough, W. A. and Landes, D. R. (1976) "Recovery and Nutritional Evaluation of Proteinaceous Solids Separated from Whey by Coagulation with Chitosan," *J. Dairy Sci.* 59, 1874–1880.
Burgess, K. J. and Kelley, J. (1979) *J. Food Tech.* 14, 325.
DeBoer, R., DeWit, J. N. and Hiddink, J. (1971) *J. Soc. Dairy Tech.* 30, 112.
Fauquant, J., Vieco, E., Brule, G. and Maubois, J.-L. (1985) *Le Lait* 65, 1–20.
Morr, C. V., Swenson, P. E., and Richter, R. L. (1973) *J. Food Sci.* 38, 324.
Newlander, J. A. and Atherton, H. V., *The Chemistry and Testing of Dairy Products,* pp. 103–108, AVI Publishing Co., Westport, Conn. 1977.
Pierre, A., Legraet, Y., Fauquant, J., Piot, M., Durier, C. and Kobilinsky, A. (1992) *Le Lait* 72, 405–420.
Marshall, K. R. (1986) "Developments in Dairy Chemistry-1" (P. F. Fox, Ed.), pp. 339–374, *Elsevier Applied Science,* New York.
Maubois, J. L., Pierre, A., Fauquant, J., and Piot, M. (1987) "Industrial Fractionation of Main Whey Proteins," *Bulletin of the IDF 212,* 154–159.
Morr, C. V. (1986) "Developments in Dairy Chemistry-1" (P. F. Fox, Ed.), pp. 375–400, *Elsevier Applied Science,* New York.
Pierre, A. & Fauquant, J. (1986) "Principes pour un procédé industriel de fractionnement des protéines du lactosérum, *Lait*".

*Primary Examiner*—Carolyn Paden

[57] ABSTRACT

The invention is directed to precipitating whey lipids from a source material such as whey by adding a sufficient amount of chitosan to form a chitosan-lipid complex, and subsequently precipitating out the lipid from the resulting whey supernatant. The precipitate is removed either by filtration or centrifugation. The supernatant contains all the whey proteins which may then be recovered by conventional means such as ultrafiltration and spray drying. The lipids from the chitosan-lipid complex are then extracted

46 Claims, 9 Drawing Sheets

FIG. 3A
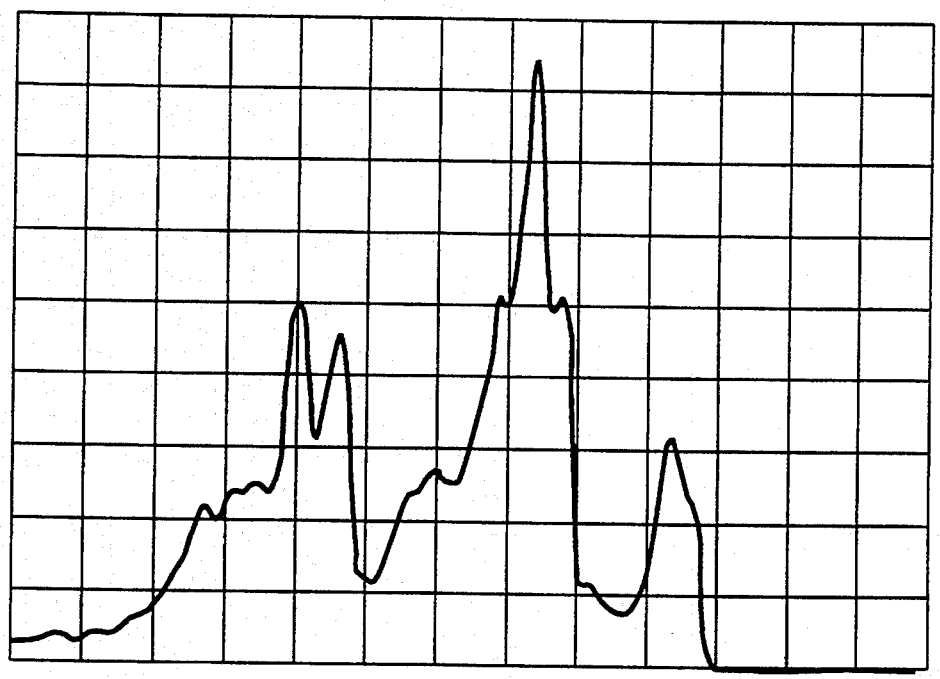
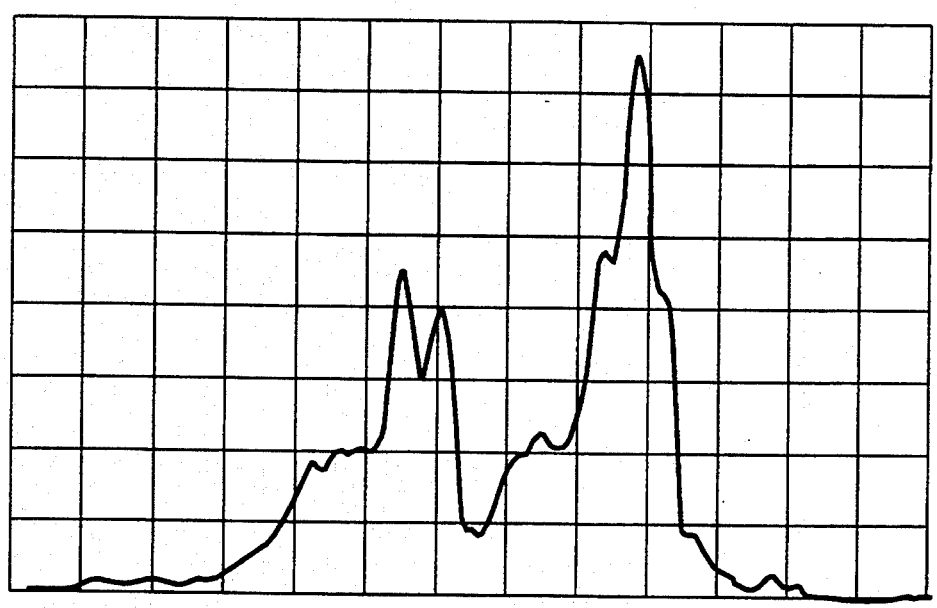
FIG. 3B

5,436,014

REMOVING LIPIDS FROM CHEESE WHEY USING CHITOSAN

FIELD OF THE INVENTION

The present invention is directed to a process of removing lipids from whey. More specifically, the present invention is directed to a process for ionically removing lipids from cheese whey using chitosan.

1. Reference Citations

The section preceding the claims is a bibliography of the references cited in this application.

2. Description of the Prior Art

In the manufacture of cheese from milk, approximately half of the milk solids are coagulated as cheese, with the remaining solids being contained in the residue or whey. Rather than disposing of the whey, it is preferable, for the economy and for ecology, to recover any useful proteins and other products from the whey. Recovering the useful constituents from whey results in a desirable whey protein concentrate (WPC) and whey protein isolates (WPI) in which the undesirable components of whey, such as salts and lactose, have been removed leaving the desirable elements.

WPC is utilized commercially as an ingredient in foam-type products such as ice cream and marshmallow, and in emulsion-type products such as mayonnaise and the like. Current commercial processes result in a whey product that is 35% whey protein concentrate, 50% lactose, 5–15% lipids and 3% calcium salt (ash). This product sells for approximately $2 per pound.

The growing demand in the food industry for functional and nutritionally excellent protein sources to replace traditional ones provides an opportunity for expanding the utilization of whey proteins in formulated food products. However, several factors limit the use of whey protein products, such as WPC and WPI, as protein ingredients in processed foods. These include 1) the economics of production of whey proteins with low lactose and mineral content; 2) off-flavors associated with whey protein concentrates and isolates; and 3) poor functionality, such as foaming and emulsifying properties, of commercial WPC prepared by the ultrafiltration method.

However, the ability of WPC to act as a surfactant is diminished if lipids are incorporated within the product. For purposes of this disclosure, the term "lipids" includes lipoproteins and phospholipid complexes as well as lipids per se.

One of the root causes of these problems is the presence of lipids in cheese whey. Sweet whey contains about 0.02% lipid (Marshall, 1986). Most of this lipid is derived from fat globule membrane fragments, which remain dispersed in a stable colloidal form, and cannot be sedimented by low centrifugal force (<10000 g). The majority of turbidity of untreated whey is mainly due to light scattering by these micron size fat globule membrane fragments. During ultrafiltration, these fat globule membrane particles foul the ultrafiltration membrane, and thus greatly reduce the efficiency of ultrafiltration. In addition, because of retention of fat globule membranes in the retentate, WPC prepared by ultrafiltration usually contain about 5 to 15% fat depending upon the protein content of the WPC (Morr et al., 1973). Oxidation of these lipids during storage and processing leads to development of off-flavors (DeBoer et al., 1977). Pretreatment of whey to reduce the fat content has been shown to improve the flavor stability.

A protein film, without lipids, has structural rigidity and is relatively strong. If lipids are present, they migrate to the surface of the film and weaken the strength of the protein film. Thus, the presence of lipid in WPC and WPI also greatly impairs the emulsifying and foaming properties of whey proteins (Morr, 1986).

Studies have shown that WPI containing 95% protein and 0.5% fat exhibited superior foaming properties than the WPC that contained 58% protein and 5% fat (Burgess and Kelly, 1979). In fact, it has been observed that no foam was formed when a 5% protein solution of commercial WPC containing 35% protein content was bubbled with air for prolonged time. The adverse effects of residual lipids on the foaming and emulsifying properties of WPC are attributed to competition of lipids with proteins for adsorption at the air-water and oil-water interfaces.

Further, the recovery of valuable proteins from whey and the removal of the undesirable whey constituents, such as salts, is difficult to accomplish in an economical and efficient manner primarily due to the lipid content in whey. Lipids significantly lower the efficiency of the recovery process, particularly when using ultrafiltration techniques or molecular sieves to selectively entrap the salts and permit the larger protein molecules to pass though the mass of molecular sieve materials without occlusion and with a minimum of resistance to their movement. In order to make the desired WPC product, the solution must undergo pressurized ultrafiltration, which purifies and concentrates the protein. However, lipids tend to block the filtration membranes thereby clogging the purification system by significantly hindering the movement of the protein molecules through the bed. Lipids may also get trapped in the retentate, reducing the purity of the final product.

Lipids can also be present in whey in the form of phospholipids which can easily be hydrolyzed and/or oxidized within the whey product, negatively affecting the flavor. A bad flavor further decreases the value of the whey product as a food ingredient.

Thus, it is evident that development of methods or processes to remove and/or reduce the fat content of WPC and WPI is imperative to solving several of the problems that limit utilization of whey proteins in processed foods.

Several approaches have been examined in the past to reduce the fat content of cheese whey prior to ultrafiltration. U.S. Pat. No. 2,606,181 to Pratt and Tinkler first reported that when the pH of whey was adjusted to 4.6 and heated to a temperature below the coagulation temperature of whey proteins, a precipitate containing 75% protein and 25% lipid was formed. Several modifications of the above general method have been pursued thereafter.

DeWit et al (1978) reported that demineralization of whey using ion exchange resins and adjustment of pH to 4.6 resulted in formation of a precipitate. The precipitate contained 90% of lipids, 99% of bacteria, and 10% of proteins that were originally present in the whey.

U.S. Pat. No. 3,560,219 to Attebery, which is incorporated herein by reference, reported that addition of 0.075 molal concentration of calcium ion to cheese whey at pH above 6.0 and at 60° C. resulted in formation of a precipitate; the precipitate contained 19% protein, 35% ash, 24% lactose, and 4.5% lipids on dry weight basis. Almost all of the original fat in the whey was removed in the precipitate.

Fauquant et al. (1985) reported that treatment of sweet whey with 8 g/l calcium chloride (i.e., 0.071M calcium) at pH 6.0 and 78°–79° C. resulted in a precipitate; the clear supernatant contained about 80% of original β-lactoglobulin and 85% of α-lactalbumin. This method was very similar to that of Attebery (supra.) except for the heating temperature. A variation of the above method was also recently reported for clarification of Emmental whey (Pierre et al., 1992).

Bough and Landes (1976) reported that addition of 2.15% chitosan to cheese whey at pH 6.0 resulted in a coagulum that contained about 73% protein, 6% lactose, 9.5% ash, 7% moisture, and 0.15% fat. Since whey proteins are negatively charged at pH 6.0, it is not surprising that electrostatic interaction of these negatively charged proteins with the positively charged chitosan resulted in a coagulum rich in protein and low in lipid content. However, it was reported that only about 0.227 g solids were recovered, indicating that the majority of protein was still in the effluent.

U.S. Pat. No. 4,844,923 to Herrmann discloses a process for deproteinizing milk products, such as whey. The milk product is heated and acidified prior to precipitation of serum proteins.

U.S. Pat. No. 4,543,261 to Harmon et al. discloses a system to separate whey components into high purity products by using an ion exchange. The process separates whey components by passing the aqueous solution downward through a gel-type strong acid cation exchange resin and eluting the resin.

U.S. Pat. No. 4,229,342 to Mirabel discloses a process for extracting proteins from milk with silica and ion exchange resins. The process involves placing skim milk in contact with at least one anion exchange resin and with silica to fix the proteins. The solution is eluted and the casein remaining in the solution from lactose and other mineral salts.

Although there are methods which may remove lipids in the form of lipo-protein complex, the extent of protein loss, denaturation of whey proteins, the high ash content, the high energy cost, and the lack of desirable functionality of the final whey protein powder have limited its commercial exploitation. Therefore, a simple and industrially feasible economic method to remove lipid from cheese whey is needed.

SUMMARY OF THE INVENTION

It is therefore an object of the present invention to provide an efficient process for removing lipids from whey without denaturing the protein fraction.

It is also an object of the present invention to improve the functional properties of WPC.

It is another object of the present invention to reduce the fat content of WPC.

These and other objects of the present invention are accomplished by the present invention which is directed to a process for removing lipids from whey comprising adding a sufficient amount of chitosan to the whey to form a chitosan-lipid complex in the whey, processing the whey for a sufficient time to precipitate the chitosan-lipid complex from the whey thereby forming a whey retentate, separating the chitosan-lipid complex from the whey retentate to form a substantially lipid-free whey protein concentrate.

The present invention is also directed to a process for purifying a whey protein concentrate from whey comprising adding a sufficient amount of chitosan to the whey to form a chitosan-lipid complex, processing the whey for a sufficient time to precipitate the chitosan-lipid complex from the whey thereby forming a whey retentate, separating the chitosan-lipid complex from the whey protein retentate; and purifying the whey protein retentate to produce the whey protein concentrate.

The invention described here to selectively precipitate fat globule membrane fragments (FGMF) and lipids from whey using chitosan offers an industrially feasible and economical process to remove lipids from cheese whey. The current bulk price of chitosan with 70–85% deacetylation is in the range of $15 to $22/kg. Assuming that a minimum of 0.016% chitosan concentration is required for precipitation of whey lipid, additional material cost that would be incurred to obtain 1 kg of lipid free whey protein isolate (100% protein basis) would be about 50 cents. If two-fold preconcentrated whey is used as feed stock, then the material cost would be reduced to 25 cents/kg. Since the quality and functional properties of the lipid free whey protein product would be superior than the current WPC products, the additional cost of 25 cents/kg (on 100% protein basis, and 8 cents/kg on 35% WPC basis) is justifiable.

The cost can be further reduced by recovering lipids and chitosan from the chitosan-FGMF complex. Lipids from the chitosan-FGMF complex can be extracted with organic solvents. The recovered chitosan can be recycled into the process. The recovered lipids, which are mainly phospholipids can be used as a value-added product in food, cosmetic, and pharmaceutical products.

In addition, since the treated whey is crystal clear and free of suspended particles, the efficiency of ultrafiltration of whey should be better than the untreated whey. It is also possible to remove approximately 80 to 90% water without major reduction in the flux rate.

The process is suitable for all types of whey, including cottage cheese and acid casein whey. In the case of cottage cheese and acid casein whey, pH adjustment to 4.5 will not be required since the pH of the whey effluent is already at about 4.5.

The process can be adapted to existing whey processing plants. It does not require major additional capital investment. The only additional equipment needed would be a centrifuge to remove the chitosan-FGMF complex.

Further objects, features and advantages of the present invention will be apparent from the following detailed description, drawings and the appended claims.

BRIEF DESCRIPTION OF THE DRAWINGS

FIG. 3A is a high performance liquid chromatography (HPLC) profile of untreated cheddar cheese whey sample.

FIG. 3B is a high performance liquid chromatography (HPLC) profile of chitosan-treated cheddar cheese whey sample.

DETAILED DESCRIPTION OF THE INVENTION

Figure 1:
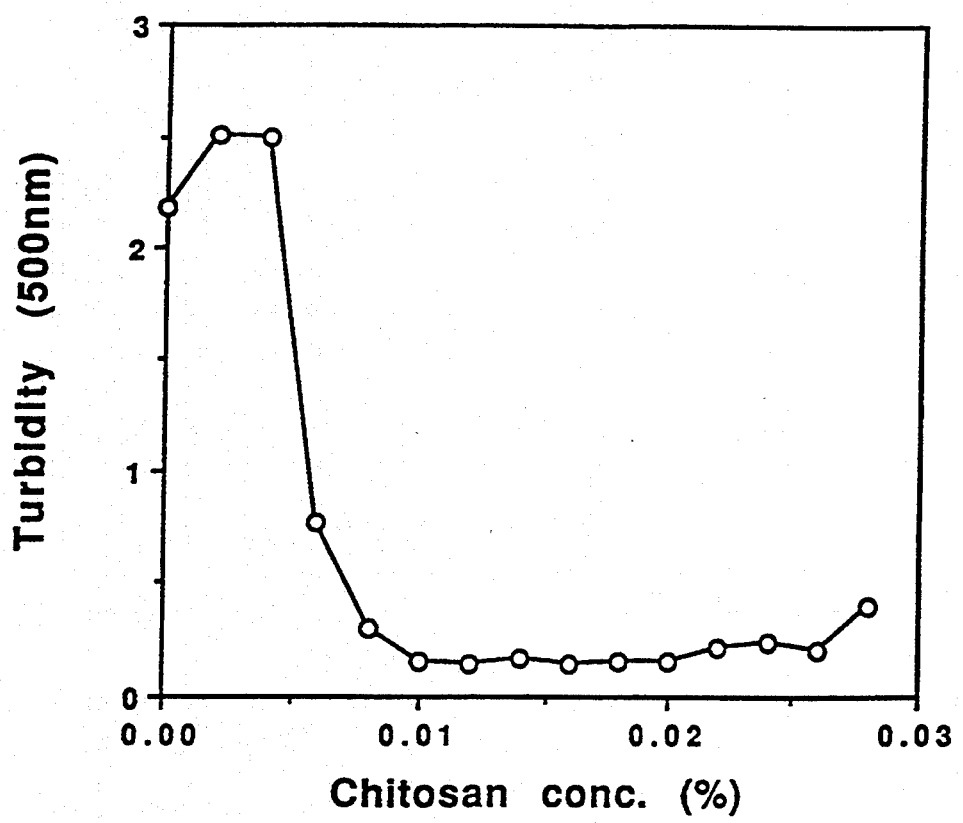
FIG. 1 is a graph illustrating the effect of chitosan concentration on precipitation of fat globule membrane fragments in cheddar cheese whey at 25° C. The pH of the whey solution was 4.5. The whey solution was centrifuged at 1176×g for 5 min. after the addition of chitosan. The ordinate represents the turbidity of the supernatant at 500 nm.

The present invention broadly relates to a process for separating out and removing lipids and lipid membranes (hereinafter referred to as "lipids") from a source material by adding chitosan to the source material. For purposes of the present invention, the term "source material" includes fermented liquids in which the removal of lipids and lipid membranes is desirable. Examples include liquid products resulting from fermentation technology processes, biotechnology processes and recombinant DNA technology processes.

The present invention has direct application to the removal of lipids (the undesirable material) from cheese whey (the source material) by forming a chitosan-lipid complex which precipitates out of the whey thereby leaving the desirable whey proteins.

The present invention is specifically directed to precipitating whey lipids from whey by adding a sufficient amount of chitosan, which adheres to the lipid to form a chitosan-lipid complex, and subsequently precipitating out the lipid from the resulting whey supernatant. The precipitate is removed either by filtration or centrifugation. The supernatant contains all the whey proteins which may then be recovered by conventional means such as ultrafiltration and spray drying. The lipids from the chitosan-lipid complex are then extracted using organic solvents, and the recovered chitosan may be reused in another process.

Chitosan

Chitosan, a charged form of chitin, is used in the process. Chitosan is a polysaccharide derived from shell fish such as shrimp or crab. Chitosan is a charged polymer that associates with the oppositely charged lipid bilayer, neutralizing the lipid bilayer and causing the lipid fragments to flocculate. Since Chitosan is a polymer the lipid bilayer is very difficult to dissociate from the chitosan. Because of the complete lack of dissociation, the lipid bilayer precipitates out of the solution completely. The polymer does not have a branching structure. Therefore there is no stearic hindrance to the association of lipids.

Source Material

The present invention is directed to removing lipids from a variety of source materials. Examples of source materials include liquid products resulting from fermentation technology processes, biotechnology processes and recombinant DNA technology processes. The key to the present invention is that the target product, e.g., proteins, peptides, antibiotics, specialty chemicals, etc., should have solubility at a pH in the range of about 4.0 to about 5.0. Removal of lipids is desirable as a step in the purification of the target product.

Source materials preferably include milk products, and more especially cheddar cheese whey but also wheys derived from other cheeses, e.g., cottage cheese and non-cheese products. The cheese whey used as starting material is preferably a sweet cheese whey such as cheddar cheese whey, swiss cheese whey or mozzarella cheese whey. The sweet cheese whey has an initial pH of about 6.2. However, an acid whey may be used, for example, cottage cheese whey having a pH between 4 and 4.5. Additionally, an acid casein effluent, a by-product of acid casein, may be used having a pH of approximately 4.5.

PROCESS

Add Chitosan to Cheese Whey

A sufficient quantity of chitosan is added to cheese whey to cause an ionic attraction between the chitosan and the lipids in the cheese whey. The lipid particles ionically attract to the chitosan to form a chitosan-lipid complex, which is held together by electrical attraction.

Preferably, chitosan is added in the amount between about 0.005% or 0.10% (v/v). More preferably, 0.01% to 0.02% (w/v) chitosan is added to the cheese whey.

pH

The pH for carrying out the process of the invention is preferably within the range of from about 4.0 to about 5.0 and more particularly within the range of from about 4.4 to about 4.5.

Initially, the pH of whey is adjusted to 4.5. Chitosan is dissolved in a 2–10% organic acid in water such as malic, acetic, citric, lactic or succinic acid. After the addition of the chitosan solution to the whey, the pH of whey is readjusted to 4.4 to 4.5. The standard in the industry is to keep a constant pH and adjust it by adding appropriate acid or alkali.

Maintenance Period

The process may be carried out over a period of from about 1 minute to about 1.5 hours and, more particularly, for a period of 5 minutes to 30 minutes.

Temperature

The process is generally carried out at ambient temperature which may vary from about 5° C. to about 45° C. A preferred operating temperature is one within the range of from about 20° C. to about 30° C.

Separating the Chitosan-Lipid Complex From the Whey Supernatant

The precipitate is removed either by filtration or centrifugation.

Filtration

A filter press aids in removing the chitosan-lipid particles before the normal ultrafiltration, which is used to purify and concentrate the cheese whey protein. A filter press is used to pass through the cheese whey removing the flocculate of lipid-chitosan particles in the filter.

Centrifugation

Alternatively the precipitate can be removed under centrifugation conditions well known to the art.

Ultrafiltration

After removing the chitosan-lipid complex, the whey can be ultrafiltered to remove water, salts and lactose.

Spray Drying

The concentrated whey is then spray dried to obtain whey protein concentrate powder. Spray drying is well known to the art.

Extraction

Lipids from the chitosan-lipid complex that are ionically bound are then extracted. The complex is treated with an organic solvent, such as chloroform, methanol, or acetone, to extract the lipids. Alternatively, the complex is redispersed in a salt solution, such as 0.2M sodium chloride with a pH adjusted to approximately 8.0. The lipids dissociate from the complex after insertion in the aqueous salt mixture. The chitosan can then be separated from the lipid supernatant by centrifugation. After separation, the chitosan may be washed and reused in the first step of the process.

BEST MODE

Whey Component

The initial component of the process is preferably a sweet whey, which includes cheddar and mozzarella cheese whey, having a pH of approximately 5.27 and approaching 6.2. An acid whey may also be used, which includes cottage cheese, having a pH between 4 and 5. A further starting whey component can be an acid casein effluent having a pH of between 4 and 5 approaching 4.5.

Depending upon the type of whey component used, the pH must be adjusted to arrange between 4.0 and 5.0, preferably approaching 4.5. The pH is adjusted by prior art methods utilizing known acids.

Dissolved Chitosan

Before the chitosan may be added to the whey component it must be dissolved in an acid, preferably an organic acid. The organic acid serves two purposes: 1) to dissolve the chitosan to an aqueous state, and 2) to adjust the solution pH within the preferable range. The prior art organic acids that may be used for dissolving the chitosan are obtained from the group consisting of acetic, malic, citric, or lactic acid. However, other stronger acids, such as hydrochloric acid, may also be used. The preferred weak acids are diluted to approximately 2% to 10% (v/v) in water.

As a practical matter, 1% to 2% (w/v) chitosan is dissolved in the acid solution. The addition of more than the preferred amount of chitosan to the acid solution would thicken the solution more than is necessary in the preferred embodiment.

Combining Chitosan Solution with the Whey Component

Chitosan is added to the whey component and combined such that the concentration of chitosan to whey is greater than or equal to 0.01% in the preferred embodiment. Preferably, the concentration is approximately 0.018%. The percentage concentration may be greater than 0.018%, however, it is more economical to maintain the concentration close to 0.02%.

The combination is preferably performed using batch conditions. The chitosan-whey mixture should be stirred for approximately 10 minutes to form a homogeneous mixture. The temperature range for stirring may be between about 5° C. to 45° C. The ambient temperature determines the amount of stirring time required to form a precipitate of chitosan-lipid complex. Continuous mixing in a flow-type system also can be used.

Separating the Precipitate from the Whey Retentate

A precipitate should form almost immediately after the chitosan solution is added to the whey component. The chitosan-lipid complex is separated from the whey by methods known to the art. One method involves a filter in which the chitosan-whey mixture is filtered under pressure. The chitosan-lipid complex is too large to pass through the filter and is therefore collected on the filter.

Another known method of separation utilizes centrifugation. Industrial centrifugation techniques (desludging) are well known and a description is not supplied here.

The separated products include a chitosan-lipid complex and a clear whey liquid that is substantially lipid-free.

Extracting the Chitosan from the Lipids

Lipids are extracted from the chitosan-lipid complex after treating the complex with an organic solvent such as chloroform, methanol, acetone, diethyl ether or petroleum ether.

Alternatively, the chitosan-lipid complex is dispersed in a salt solution such as 0.2M sodium chloride (NaCl) in the preferred embodiment. At this stage, the pH must be adjusted to approximately 7 to 8.5 preferably, 8.0. In the salt solution, the lipids dissociate from the chitosan, and the chitosan forms an insoluble precipitate which may be removed by centrifugation. The remaining supernatant is a lipid solution which appears cloudy. The dissociated chitosan may then be washed and recycled in this process.

Ultrafiltration

The whey protein supernatant, which is substantially free of lipids, may be filtered utilizing an ultrafilter to remove water and lactose. Ultrafiltration is a process known to the art which removes up to 80-90% water and a substantial amount of the lactose. The ultrafiltration further concentrates the protein, which is then spray dried to form a whey protein concentrate (WPC) which is approximately 80% to 90% protein and free of lipids. Whey protein concentrate is used in a number of food products.

The present invention is described with respect to the following example, which is not intended to limit the disclosure.

EXAMPLE

The present study was designed to show that fat globule membranes in cheese whey can be selectively precipitated by chitosan under appropriate conditions.

MATERIALS AND METHODS

Cheddar cheese whey was obtained fresh from a local cheese industry. The pH of the fresh sweet whey was about 6.2. The whey was brought to the laboratory in a ice bath and used immediately upon arrival. Chitosan (made from crab shell) was from Sigma Chemical Co. (St. Louis, Mo.). All other chemicals were of analytical grade.

Precipitation of Lipids: Precipitation of whey lipids by chitosan was studied as follows: The temperature of cheese whey was brought up to the experimental temperature by incubating in a water bath. The pH of sweet whey was adjusted to the experimental pH to be studied. A stock solution of chitosan (1%) was prepared in 10% acetic acid. A known amount of chitosan stock solution was added to an aliquot of whey. The final pH of the mixture was readjusted to the original experimental pH by adding μl quantities of 5N NaOH. The whey solution became more turbid immediately upon addition of chitosan. The solution was incubated at the experimental temperature for 10 min. During this time, the precipitate that was formed had begun to settle down at the bottom of the tube. After the incubation period, the solution was centrifuged at 1176×g in a laboratory clinical centrifuge (International Equipment Co., Needham Heights, Mass.). The turbidity of the supernatant was measured at 500 nm using a Beckman DU-68 spectrophotometer. A control, containing no added chitosan, was performed under identical conditions. The differences in the turbidity of the supernatants of the control and the chitosan-treated whey represented the efficiency of precipitation and removal of fat globule membrane fragments from the whey.

Analytical Methods: The protein content of whey before and after treatment with chitosan was determined by high performance liquid chromatography (HPLC) using a TSK 2000 SW gel permeation column (Biorad). The untreated whey was first filtered through a 0.2 micron syringe filter. 20 μl of the filtrate was injected into the HPLC column and the protein elution profile was recorded using water as the eluent. To determine whether treatment with chitosan resulted in loss of whey proteins along with the precipitate, 20 μl of the supernatant of the treated whey was injected into the HPLC column and the elution profile was determined. The loss of protein was determined from differences in the elution profiles and in the area under each protein peak in the profile. In addition to HPLC, sodium dodecyl sulfate-polyacrylamide gel electrophoresis (SDS-PAGE) of the chitosan-treated and untreated whey also was performed to detect any loss of whey proteins as a result of the treatment with chitosan.

To determine the lipid content, first the untreated and treated whey were freeze dried. The lipid content of these dried samples were determined according to the Mojonnier method (Newlander and Atherton, 1977). The percent removal of lipid by the chitosan treatment was determined from the differences in the total lipid contents of untreated and treated whey.

Ultrafiltration: Ultrafiltration of sweet whey was performed using a bench-top ultrafiltration unit (Tri-Clover Inc., Kenosha, Wis.) fitted with a U4-E500 spiral wound membrane (Desalination Inc., Escondido, Calif.).

RESULTS

Preliminary experiments indicated that the optimum pH for formation of insoluble complex between chitosan and FGMF in cheese whey was in the neighborhood of 4.5. To determine the minimum chitosan concentration needed to cause maximum precipitation of FGMF, the turbidity of the supernatant as a function of added chitosan concentration at pH 4.5 was studied.

As illustrated in FIG. 1, the turbidity of the supernatant decreased with increase of chitosan concentration. At 0.01 to 0.02% chitosan concentration, more than 95% of the turbidity causing materials have been removed from cheese whey. The data in FIG. 1 suggest that addition of about 0.01 to 0.02% of chitosan to a typical cheese whey should result in almost total removal of FGMF.

Figure 2:
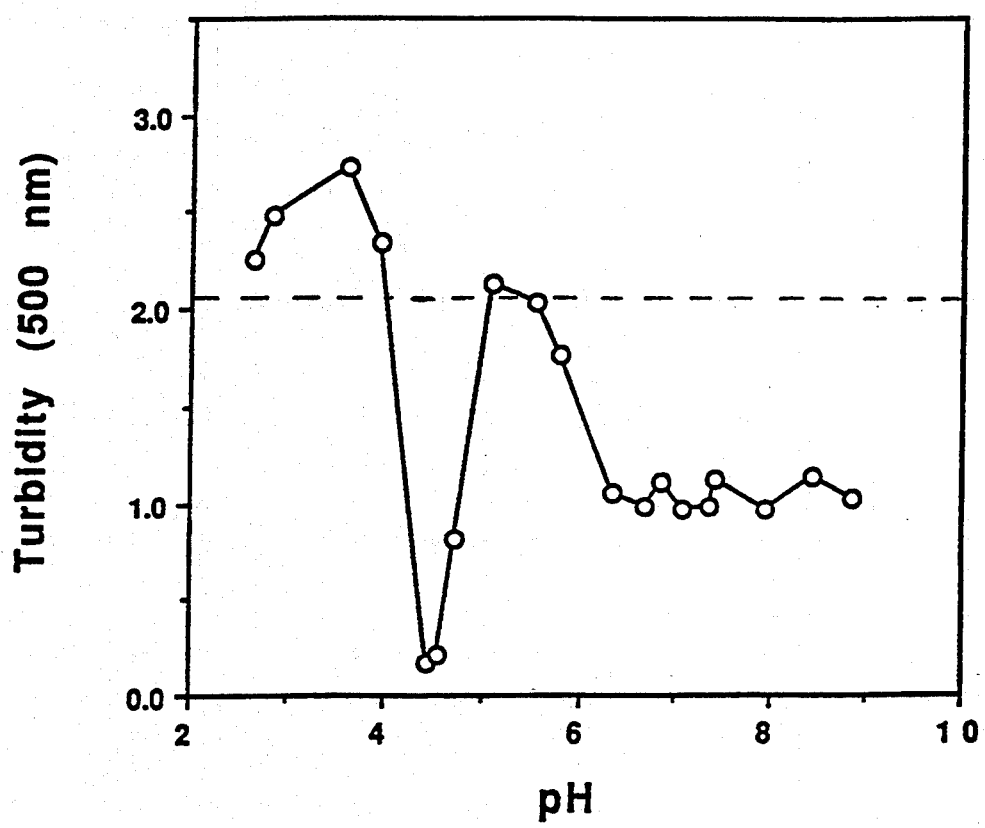
FIG. 2 is a graph illustrating the effect of pH on precipitation of fat globule membrane fragments (FGMF) of cheddar cheese whey by chitosan. The chitosan concentration was 0.024%. The dotted line represents the turbidity of untreated whey.

FIG. 2 illustrates the effect of solution pH on the efficiency of precipitation of FGMF by chitosan. The chitosan concentration was fixed at 0.024%. Increase of pH from 3 to 4 caused an increase in turbidity of the supernatant, indicating that at this pH range the interaction between chitosan and FGMF resulted in formation of a colloidal complex that did not sediment at 1176×g force. The increase in turbidity might be because of the larger particle size of the chitosan-FGMF complex compared to the size of the FGMF alone. When the pH was increased from 4.0 to 4.5, the turbidity of the supernatant precipitously dropped to a very low value, and the supernatant was visually crystal clear. Above pH 5.0 the turbidity of the supernatant progressively increased, indicating a decrease in the efficiency of precipitation.

The data in FIG. 2 clearly indicate that the chitosan-FGMF complex undergoes a phase transition in a narrow pH range near 4.5. Below pH 4.5 and above pH 5.0, the chitosan-FGMF complex possesses a significant amount of net positive or negative charge, which decreases the tendency of the complex to flocculate. In the narrow pH range 4.5 to 5.0, the complex might have zero net charge, which facilitates flocculation and precipitation of the complex via hydrophobic and possibly hydrogen bonding interactions.

To determine whether loss of whey proteins occurred during precipitation of FGMF with chitosan at pH 4.5, the HPLC profile of the clear supernatant was analyzed and compared with that of the untreated whey that was filtered through a 0.2 micron filter. The HPLC profiles were identical except for a peak at the void volume of the column in the case of the untreated sample as illustrated in FIGS. 3A and 3B. This high molecular weight species might be related to the presence of smaller than 0.2 micron size FGMF in the filtrate that were not retained by the 0.2 micron filter.

Figure 4:
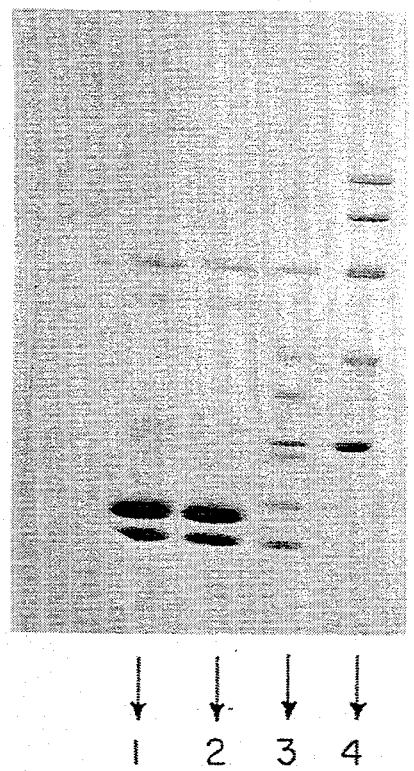
FIG. 4 is an electrophorogram illustrating SDS-PAGE patterns of untreated (column 1) and treated (column 2) cheddar cheese whey samples from the example. 20 ul samples were loaded onto the gel. Columns 3 and 4 are molecular weight markers.

The fact that the rest of the elution profiles were the same both in terms of the number of peaks and the area (intensity) under the peaks suggests that no soluble whey proteins were lost during precipitation of FGMF by chitosan. This was further confirmed by SDS-PAGE of untreated and chitosan-treated whey. As illustrated in FIG. 4, the electrophorograms of untreated and treated whey samples contained the same number of protein bands, and intensities of these bands, especially the β-lactoglobulin and α-lactalbumin bands, were similar, indicating that no whey protein was lost during precipitation of FGMF with chitosan.

Figure 5:
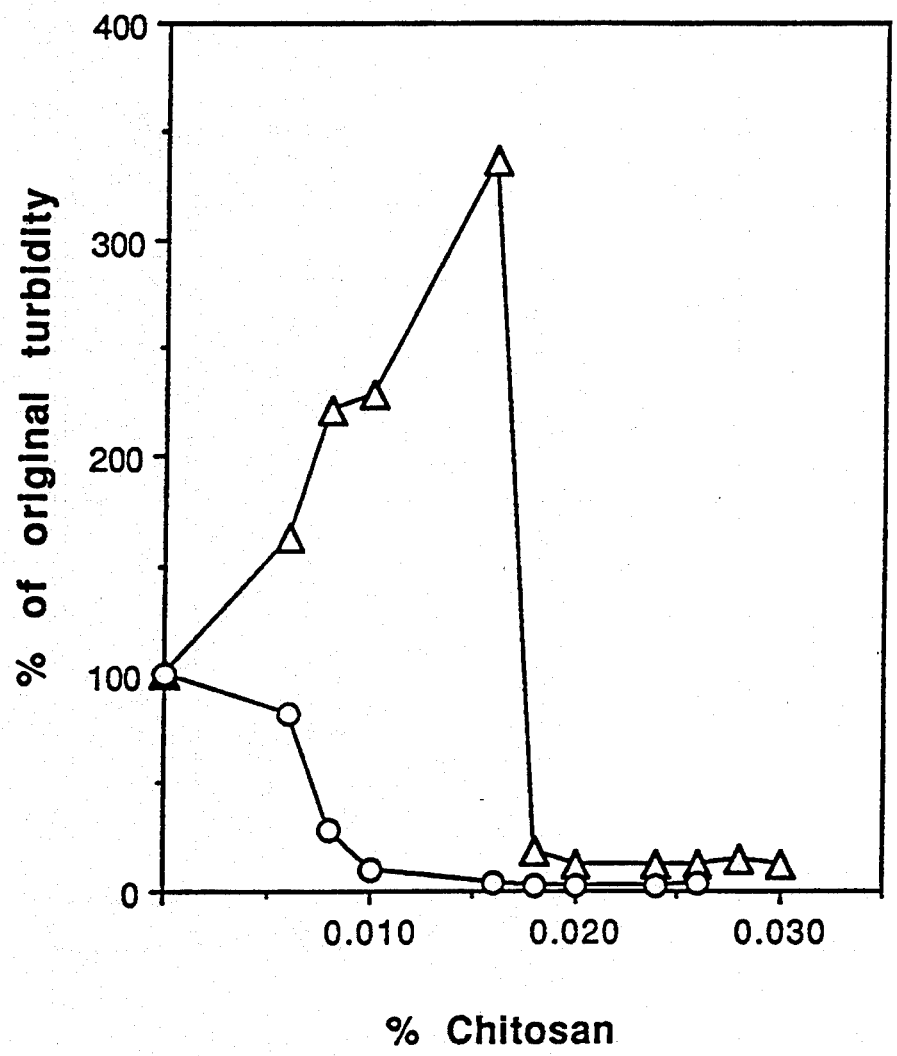
FIG. 5 is a graph illustrating the effect of temperature on precipitation of FGMF by chitosan. The ordinate represents turbidity of samples after centrifugation at $1176 \times g$ for 5 min. The pH was 4.5. Temperatures were as follows: o—o: 25° C.; ∆—∆: 45° C.

The effect of temperature on the efficiency of precipitation of FGMF by chitosan is shown in FIG. 5. Below 0.018% chitosan concentration, the increase of temperature resulted in increased turbidity of the supernatant. However, above 0.018% chitosan concentration the turbidities of the supernatants were very low, and were practically independent of the temperature.

Figure 6:
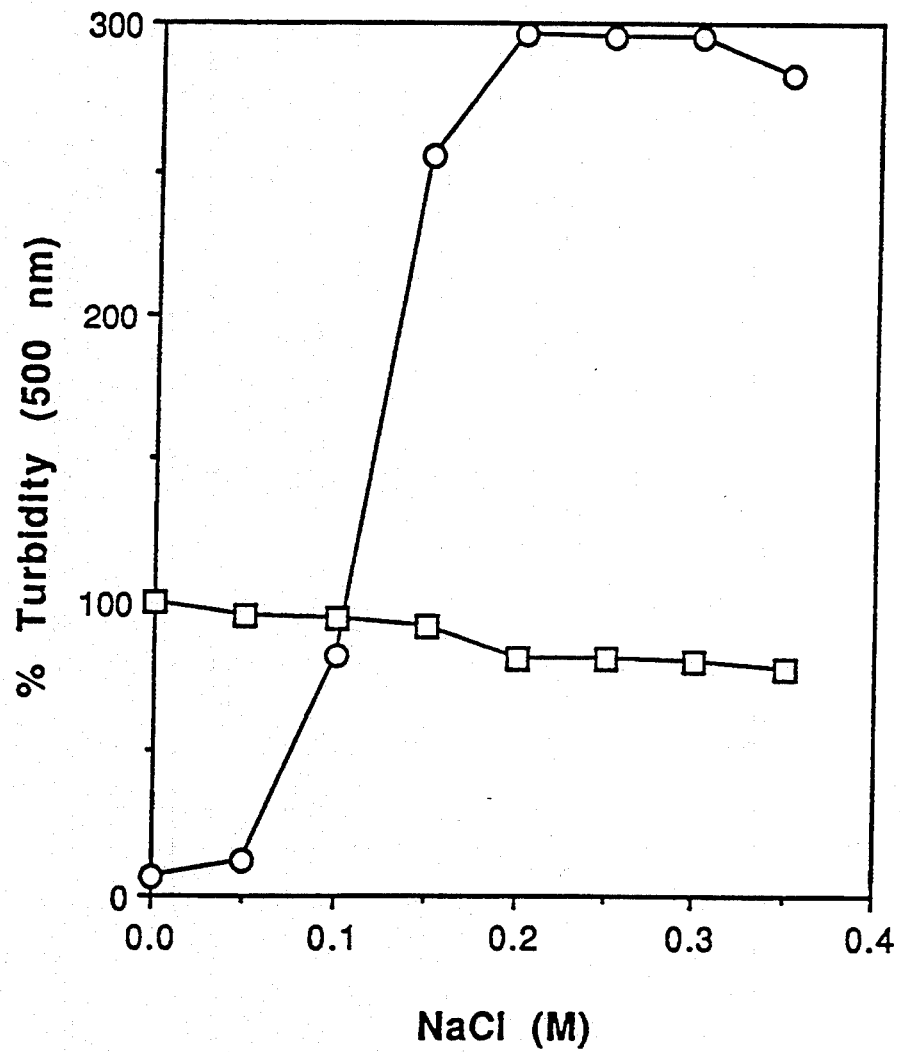
FIG. 6 is a graph illustrating the effect of NaCl concentration on precipitation of fat globule membranes by chitosan. The pH of the reaction was 4.5, and the chitosan concentration was 0.02%. Chitosan was added to whey at pH 4.5 containing an added amount of NaCl. After incubation at 25° C. for 10 min, the solutions were centrifuged at $1176 \times g$ for 5 min, and the turbidities of the supernatants were measured.

The stability of the insoluble chitosan-FGMF complex formed upon addition of 0.024% chitosan to whey at pH 4.5 was affected by the ionic strength of the solution, illustrated in FIG. 6. The addition of NaCl progressively increased the turbidity of the supernatant. At 0.2M added NaCl concentration, the turbidity of the centrifuged supernatant was 300% that of the untreated whey. This increase in turbidity might be attributed to ion binding, and dispersion of the chitosan-FGMF precipitate into a stable colloidal form by the salt. The fact that there was no increase in turbidity when NaCl was added to the untreated whey indicates that the increase in turbidity in the case of chitosan-treated whey cannot be due to salt induced precipitation of whey proteins at pH 4.5.

Figure 7:
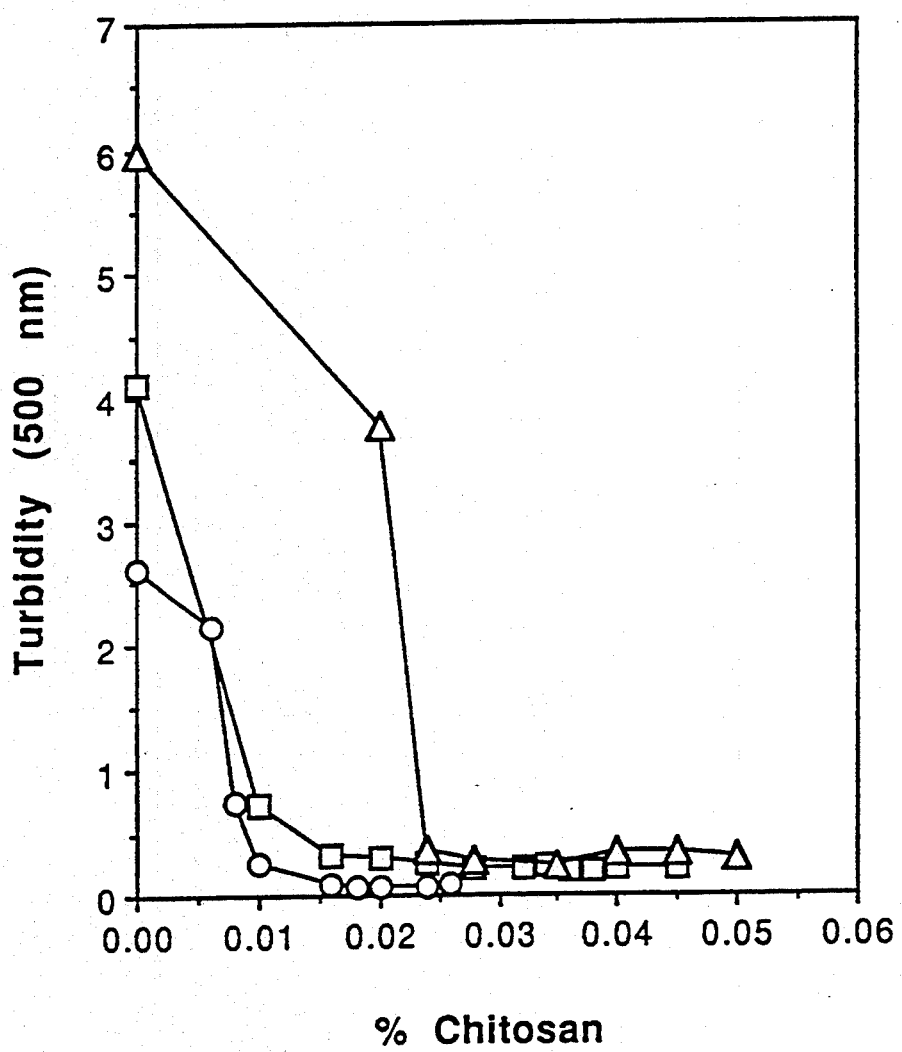
FIG. 7 is a graph illustrating the effect of preconcentration of cheddar cheese whey on the efficiency of removal of fat globule membranes by chitosan. o—o: single-fold whey; □—□: two-fold whey; ∆—∆: four-fold whey.

The effect of preconcentration of whey by ultrafiltration on the efficiency of FGMF precipitation by chitosan is shown in FIG. 7. The minimum chitosan concentration required to precipitate FGMF increased with fold-concentration of whey. For example, the minimum chitosan concentration was about 0.016% for single-fold whey and about 0.02% and 0.025% for the two-fold and four-fold concentrated whey.

Figure 8:
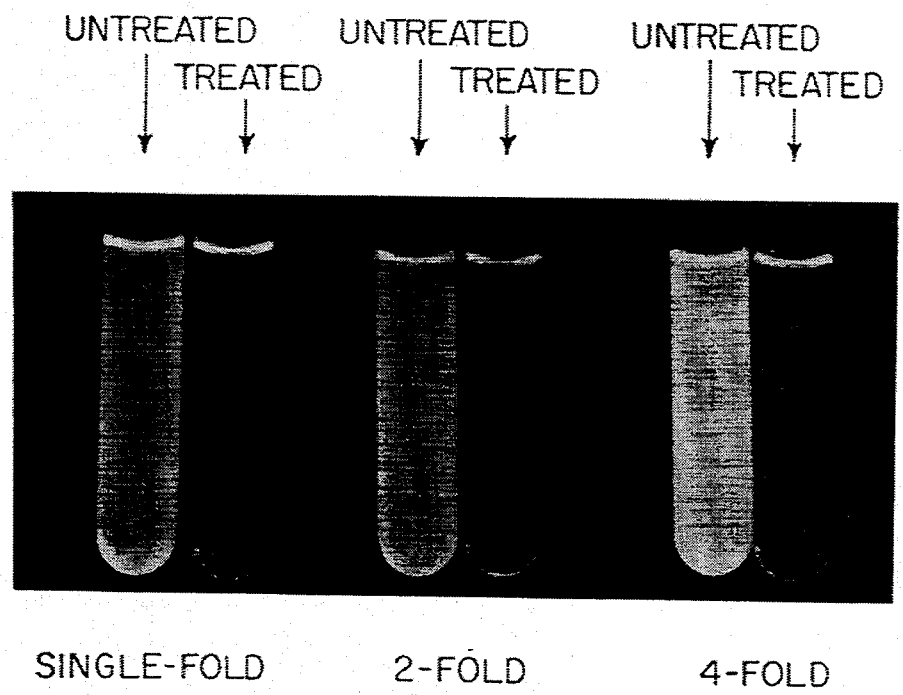
FIG. 8 are photographs illustrating untreated and chitosan-treated ultrafiltered whey samples. The solutions were centrifuged at $1176 \times g$ for 5 min.
Figure 9:
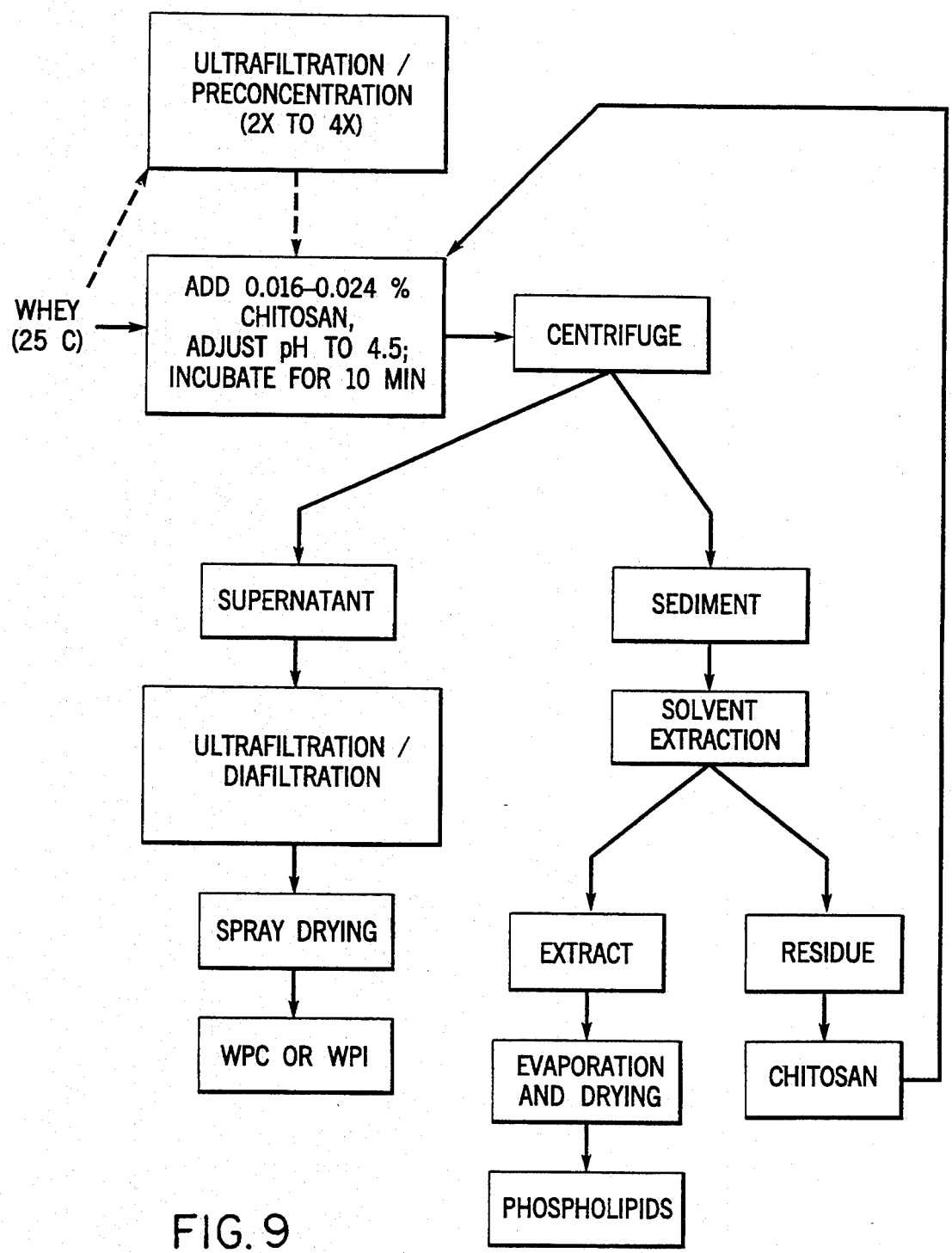
FIG. 9 is a process flow chart illustrating the removal of lipids and the production of fat-free whey protein concentrates/isolates and phospholipids from cheese whey.

The visual appearances of the untreated and treated whey samples are shown in FIG. 8. In the cases of single-fold and two-fold concentrated whey, the supernatants obtained after treatment with 0.016% chitosan at pH 4.5 were crystal clear, indicating efficient removal of FGMF. In the case of four-fold concentrated whey, the supernatant obtained after treatment with 0.024% chitosan also was crystal clear, but the solution was more greenish-yellow in color; much of the turbidity (absorbance) at 500 nm was due to this greenish-yellow color rather than due to suspended particles. These results indicated that preconcentration of whey up to four-fold only marginally increased the minimum concentration of chitosan required for efficient precipitation of FGMF.

The total lipid content of dialyzed untreated whey was about 3.25%, whereas that of the dialyzed chitosan-treated whey supernatant was less than 0.26% on dry weight basis. Because the lipid content of the treated whey powder was very low, determination of the exact lipid content of the sample was difficult. It is quite likely that the actual lipid content might be much lower than the estimated 0.26%. Nonetheless, the results indicated that treatment of whey with chitosan removed more than 92% of lipids originally present in whey. The remaining lipids might be represented in bound form with some of the whey proteins.

The results presented here clearly show that free lipids and fat globule membrane fragments in cheese whey can be selectively precipitated by adding about 0.016 to 0.024% chitosan at pH 4.5 and at room temperature. The mechanism of precipitation apparently involves electrostatic interaction between the positively charged chitosan and the negatively charged FGM fragments at pH 4.5. Since the major whey proteins, such as β-lactalbumin, β-lactoglobulin, and bovine serum albumin are either positively charged or electrically neutral at pH 4.5, they do not interact with the positively charged chitosan. Furthermore, since these whey proteins are highly soluble at their isoelectric pH, they remain in solution at pH 4.5 and thus enable selective precipitation of the chitosan-FGMF complex.

It is understood that the invention is not confined to the particular construction and arrangement herein described, but embraces such modified forms thereof as come within the scope of the following claims.

BIBLIOGRAPHY

Attebery, J. M. U.S. Pat. No. 3,560,219.

Bough, W. A. and Landes, D. R. (1976) "Recovery and nutritional evaluation of proteinaceous solids separated from whey by coagulation with chitosan," *J. Dairy Sci.* 59, 1874–1880.

Burgess, K. J. and Kelley, J. (1979) *J. Food Tech.* 14, 325.

DeBoer, R., DeWit, J. N. and Hiddink, J. (1971) *J. Soc. Dairy Tech.* 30, 112.

DeWit, J. N., Klarenbeck, G. and DeBoer, R. (1978) *20th International Dairy Congress*, E.919.

Fauquant, J., Vieco, E., Brule, G. and Maubois, J. L. (1985) *Le Lait* 65, 1–20.

Harmon et al. U.S. Pat. No. 4,543,261

Herrmann U.S. Pat. No. 4,844,923

Marshall, K. R. In "Developments in Dairy Chemistry-1", (P. F. Fox, Ed), pp 339–374, *Elsevier Applied Science*, New York, 1986.

Mirabel U.S. Pat. No. 4,229,342

Morr, C. V., Swenson, P. E., and Richter, R. L. (1973) *J. Food Sci.* 38, 324.

Morr C. V. In "Developments in Dairy Chemistry-1", (P. F. Fox, Ed.), pp. 375–400, *Elsevier Applied Science*, New York, 1986.

Newlander, J. A. and Atherton, H. V., *The Chemistry and Testing of Dairy Products*, pp. 103–108, AVI Publishing Co., Westport, Conn., 1977.

Pierre, A., Legraet, Y., Fauquant, J., Piot, M., Durier, C. and Kobilinsky, A. (1992) *Le Lait* 72, 405–420.

Pratt, W. J. and Tinkler, F. H. (1952) U.S. Pat. No. 2,606,181.

I claim:

1. A process for removing lipids from a source material comprising:
    a. adding a sufficient amount of chitosan to the source material to form a chitosan-lipid complex in solution;
    b. adjusting the solution to a pH of about 4.0 to 5.0.
    c. mixing the solution for a sufficient time to form a precipitate of the chitosan-lipid complex; and
    d. separating the chitosan-lipid complex from the solution to form a substantially lipid-free protein retentate.

2. The process of claim 1 wherein the source material is selected from liquid products resulting from fermentation technology processes, biotechnology processes and recombinant DNA technology processes.

3. The process of claim 1 wherein the source material is selected from the group consisting of cheddar cheese whey, cottage cheese whey, swiss cheese whey and mozzarella cheese whey.

4. The process of claim 3 wherein the pH of the whey is about 4.5.

5. The process of claim 1 wherein step c. is carried out at ambient temperature.

6. The process of claim 1 wherein step c. is carried out at a temperature of from about 5° C. to about 45° C.

7. The process of claim 1 wherein step c. is carried out at a temperature of from about 20° C. to about 23° C.

8. The process of claim 1 wherein the mixing is maintained for a period of from about 1 minute to about 30 minutes.

9. The process of claim 1 wherein the mixing is maintained for a period of about 10 minutes.

10. The process of claim 1 wherein the pH of the source material is adjusted by adding a sufficient amount of a pH reducing acid.

11. The process of claim 10 wherein the acid is an organic acid selected from the group consisting of acetic acid, malic acid, citric acid and lactic acid.

12. The process of claim 1 comprising adding between about 0.005% and 0.03% (w/v) chitosan to the solution.

13. The process of claim 1 comprising adding about 0.02% (w/v) chitosan to the solution.

14. The process of claim 1 comprising separating the chitosan-lipid complex from solution by a filter.

15. The process of claim 1 comprising separating the chitosan-lipid complex from solution by centrifugation.

16. A process for removing lipids from whey comprising:
 a. adding a sufficient amount of chitosan to the whey to form a chitosan-lipid complex in solution;
 b. adjusting the solution to a pH of about 4.0 to 5.0.
 c. mixing the solution for a sufficient time to form a precipitate of the chitosan-lipid complex; and
 d. separating the chitosan-lipid complex from the solution to form a substantially lipid-free whey protein retentate.

17. The process of claim 16 wherein the pH of the whey is from about 4.0 to about 4.5.

18. The process of claim 16 wherein the pH of the whey is about 4.5.

19. The process of claim 16 wherein step c. is carried out at ambient temperature.

20. The process of claim 16 wherein step c. is carried out at a temperature of from about 5° C. to about 45° C.

21. The process of claim 16 wherein the process is carried out at a temperature of from about 20° C. to about 23° C.

22. The process of claim 16 wherein the mixing is maintained for a period of from about 1 minute to about 30 minutes.

23. The process of claim 16 wherein the mixing is maintained for a period of about 10 minutes.

24. The process of claim 16 wherein the whey is selected from the group consisting of cheddar cheese whey, swiss cheese whey and mozzarella cheese whey.

25. The process of claim 16 wherein the whey is selected from the group consisting of acid whey.

26. The process of claim 25 wherein the acid whey includes cottage cheese.

27. The process of claim 16 wherein the pH of the whey is adjusted by adding a sufficient amount of a pH reducing acid.

28. The process of claim 27 wherein the acid is an organic acid selected from the group consisting of acetic acid, malic acid, citric acid and lactic acid.

29. The process of claim 16 comprising adding between about 0.005% and 0.03% (w/v) chitosan to the solution.

30. The process of claim 29 comprising adding about 0.02% (w/v) chitosan to the solution.

31. The process of claim 16 comprising separating the chitosan-lipid complex from solution by a filter.

32. The process of claim 16 comprising separating the chitosan-lipid complex from solution by centrifugation.

33. A process for purifying a whey protein concentrate from whey comprising:
 a. adding a sufficient amount of chitosan to the whey to form a chitosan-lipid complex in solution;
 b. adjusting the solution to a pH of about 4.0 to 5.0;
 c. mixing the solution for a sufficient time to form a precipitate of the chitosan-lipid complex;
 d. separating the chitosan-lipid complex from the solution to form a substantially lipid-free whey protein retentate; and
 e. concentrating the whey protein retentate to produce a whey protein concentrate.

34. The process of claim 33 wherein the pH of the whey is from about 4.0 to about 4.5.

35. The process of claim 34 wherein the pH of the whey is about 4.5.

36. The process of claim 33 wherein step c. is carried out at an ambient temperature.

37. The process of claim 33 wherein step c. is carried out at a temperature of from about 20° C. to about 23° C.

38. The process of claim 33 wherein the whey is selected from the group consisting of sweet whey.

39. The process of claim 33 wherein the whey is selected from the group consisting of acid whey.

40. The process of claim 33 comprising adding between about 0.005% and 0.03% (w/v) chitosan to the solution.

41. The process of claim 33 comprising adding about 0.02% (v/v) chitosan to the solution.

42. The process of claim 33 comprising separating the chitosan-lipid complex from solution by a filter.

43. The process of claim 33 comprising separating the chitosan-lipid complex from solution by centrifugation.

44. The process of claim 33 wherein purifying the whey protein concentrate includes ultrafiltration.

45. A process for obtaining a lipid concentrate from whey comprising:
 a. adding a sufficient amount of chitosan to the whey to form a chitosan-lipid complex in solution;
 b. adjusting the solution to a pH of about 4.0 to 5.0;
 c. forming a precipitate of the chitosan-lipid complex;
 d. separating the chitosan-lipid complex from the solution; and
 e. extracting the lipid from the chitosan-lipid complex.

46. The process of claim 45 wherein the pH of the whey is about 4.5.

* * * * *